US007479353B2

(12) United States Patent
Hollenkamp et al.

(10) Patent No.: US 7,479,353 B2
(45) Date of Patent: Jan. 20, 2009

(54) ENERGY STORAGE DEVICES

(75) Inventors: Anthony Frank Hollenkamp, Camberwell (AU); Patrick Craig Howlett, Bentleigh (AU); Douglas Robert MacFarlane, East Brighton (AU); Stewart Alexander Forsyth, Belfast (GB); Maria Forsyth, Ashburton (AU)

(73) Assignees: Commonwealth Scientific and Industrial Research Organisation, Campbell (AU); Monash University, Clayton, Victoria (AU)

( * ) Notice: Subject to any disclaimer, the term of this patent is extended or adjusted under 35 U.S.C. 154(b) by 413 days.

(21) Appl. No.: 10/548,333

(22) PCT Filed: Mar. 3, 2004

(86) PCT No.: PCT/AU2004/000263

§ 371 (c)(1),
(2), (4) Date: Sep. 7, 2005

(87) PCT Pub. No.: WO2004/082059

PCT Pub. Date: Sep. 23, 2004

(65) Prior Publication Data

US 2006/0210873 A1    Sep. 21, 2006

(30) Foreign Application Priority Data

Mar. 13, 2003  (AU) ............................ 2003901144

(51) Int. Cl.
*H01M 10/40* (2006.01)
*H01G 9/035* (2006.01)
*H01G 9/038* (2006.01)

(52) U.S. Cl. .................. 429/324; 429/328; 429/336; 429/339; 252/62.2; 361/502; 361/505

(58) Field of Classification Search ................ 429/324, 429/328, 336, 339; 252/62.2; 361/502, 503, 361/504, 505
See application file for complete search history.

(56) References Cited

U.S. PATENT DOCUMENTS

| 5,202,042 | A  | * | 4/1993 | Tsuji et al. ................. 252/62.2 |
| 6,710,999 | B2 | * | 3/2004 | Kawasato et al. ........... 361/505 |
| 7,084,290 | B2 |   | 8/2006 | Ignatyev et al. |
| 7,166,238 | B2 | * | 1/2007 | Kato et al. .............. 429/324 X |
| 2003/0003358 | A1 | | 1/2003 | Mandal et al. |
| 2004/0170890 | A1 | | 9/2004 | Matsunaga et al. |
| 2006/0217568 | A1 | | 9/2006 | Ignatyev et al. |

FOREIGN PATENT DOCUMENTS

EP    1 267 369    12/2002

(Continued)

OTHER PUBLICATIONS

MacFarlane et al. "Lithium-doped plastic crystal electrolytes exhibiting fast ion conduction for secondary batteries." *Nature* vol. 402. Dec. 1999. pp. 792-794.
Forsyth et al. "Lithium doped N-methyl-N-ethylpyrrolidinium bis(trifluoromethanesulfonyl)amide fast-ion conducting plastic." *J. Mater. Chem.* vol. 10. 2000. pp. 2259-2265, (no month).

(Continued)

*Primary Examiner*—Stephen J. Kalafut
(74) *Attorney, Agent, or Firm*—Merchant & Gould P.C.

(57) ABSTRACT

Pyrrolidinium-based room temperature ionic liquids, and phosphorus and arsenic analogues, are used as electrolytes in energy storage devices including secondary lithium batteries, supercapacitors and asymmetric battery-supercapacitors. The electrolytes preferably contain lithium ions as the charge-carrying species. The electrolytes are in a liquid state at the operating temperature.

40 Claims, 7 Drawing Sheets

FOREIGN PATENT DOCUMENTS

| | | |
|---|---|---|
| JP | 2002-299179 | 10/2002 |
| JP | 2003-217655 A | 7/2003 |
| JP | 2003-331918 | 11/2003 |
| WO | WO 99/40025 | 8/1999 |
| WO | 02/054515 A2 | 7/2002 |
| WO | 02/082570 A1 | 10/2002 |
| WO | WO 02/098844 A1 | 12/2002 |
| WO | WO 03/012900 | 2/2003 |

OTHER PUBLICATIONS

MacFarlane et al. "Pyrrolidinium Imides: A New Family of Molten Salts and Conductive Plastic Crystal Phases." *J. Phys. Chem. B.* vol. 103. 1999. pp. 4164-4170, (no month).

Hill et al. "Microstructural and molecular level characterization of plastic crystal phases of pyrrolidium trifluoromethanesulfonyl salts." *Solid State Ionics.* vol. 154-155. 2002. pp. 119-124, (no month).

* cited by examiner

ENERGY STORAGE DEVICES

This invention relates to the application of pyrrolidinium based room temperature ionic liquids as electrolytes in energy storage devices such as secondary lithium batteries. The present invention further relates to energy storage devices, and particularly secondary lithium batteries, containing the electrolyte.

BACKGROUND TO THE INVENTION

Lithium rechargeable batteries (i.e. secondary lithium batteries, in which lithium ions are the principal charge carriers) are important devices in the field of energy storage. They offer advantages over other secondary battery technologies due to their higher gravimetric and volumetric capacities as well as higher specific energy.

Secondary lithium batteries fall into two classes—those in which the negative electrode is lithium metal, known as a "lithium metal battery", and those in which the negative electrode is comprised of a lithium intercalation material, known as "lithium-ion batteries". In terms of specific energy and power, lithium metal is the preferred negative electrode material. However, when 'traditional' solvents are used in combination with lithium metal negative electrodes, there is a tendency for the lithium metal electrode to develop a dendritic surface [1]. The dendritic deposits limit cycle life and present a safety hazard due to their ability to short circuit the cell—potentially resulting in fire and explosion. These shortcomings have necessitated the use of lithium intercalation materials as negative electrodes (creating the well-known lithium-ion technology), at the cost of additional mass and volume for the battery.

Researchers have continued to search for a solution to the poor cycling characteristics of the lithium metal electrode—notably through the use of polymer electrolytes. However lithium ion motion in polymer electrolytes is mediated by segmental motions of the polymer chain leading to relatively low conductivity. The low conductivity and low transport number of the polymer electrolytes has restricted their application in practical devices. Alternative solvents such as 1,3 dioxolane have been trialled with some success (i.e. uniform lithium deposition morphology) but have been found to react with lithium during cycling of the battery—thus the electrolyte eventually dries out and the battery fails prematurely [2].

In another field, since their first observation in 1927, various parties have studied room temperature ionic liquids (RTILs) and their potential applications. Room temperature ionic liquids are organic ionic salts having a melting point below the boiling point of water (100° C.). Accordingly, within this class are organic ionic salts that are liquid over a wide temperature range, typically from below room temperature to above 200° C.

Room temperature ionic liquids have been known for a long time, although those studied before 1992 were moisture sensitive, which hampered the development of practical applications. In 1992 the first air and moisture stable ionic liquids were reported, and since then a large number of anion-cation combinations have been developed.

However, compared to other solvent systems, published research pertaining to the use of room temperature ionic liquids in lithium secondary batteries is sparse. Few, if any, of the systems proposed have been demonstrated to be capable of use in practice. Some systems reported contain air and moisture sensitive room temperature ionic liquids. Research on other systems indicates that the battery would have insufficient cycling efficiency or would be subject to severe limits on the possible charging/discharging rates. Other publications specify that the room temperature ionic liquids must be used in the solid phase. Moreover, little work if any has been reported to show whether the proposed systems enable lithium to be both taken up by the negative electrode, and importantly then released. Unless this is achievable, and demonstrated, it cannot be predicted the electrolyte will have utility in a secondary battery application.

DESCRIPTION OF THE INVENTION

According to the present invention there is provided an electrolyte for use in an energy storage device, the electrolyte comprising a room temperature ionic liquid of:

(i) a cation of Formula I:

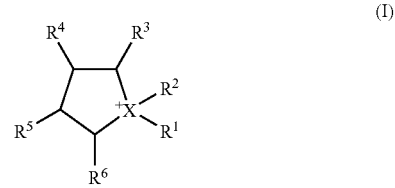

in which X is N, P or As $R^1$ is alkyl or a fully or partially halogenated alkyl;

$R^2$ is alkyl or a fully or partially halogenated alkyl;

$R^3$ to $R^6$ are each independently H, alkyl, halo, fully or partially halogenated alkyl, nitrile, alkyl substituted by nitrile or heteroatom, or any other group; and (ii) an anion;

together with (iii) lithium ions.

It has been demonstrated in the present application that the described room temperature ionic liquid (RTIL) electrolytes provide uniform deposition of lithium metal onto an electrode (i.e. provide uniform lithium deposition morphology), together with good release of lithium back into the electrolyte, resulting in cycling of lithium at high efficiency. In addition the electrolyte is nonvolatile and nonflammable.

The electrolyte may comprise one or more further components, including one or more further room temperature ionic liquids, one or more solid electrolyte interphase-forming additives; one or more gelling additives; counterions to the lithium ions which are either the same as or different to the anions of the room temperature ionic liquid; and organic solvents. Consequently, references to "a" cation or "an" anion should be interpreted broadly to encompass one or more of each of these.

Solid electrolyte interphase-forming additives are shown to improve the deposit morphology and efficiency of the lithium cycling process. The gelling additives provide a gel material while retaining the conductivity of the liquid. This offers specific benefits over liquids in that it will enable fabrication of a flexible, compact, laminated device free from leakage and capable of construction with varying geometry.

The electrolytes of the present invention are liquid at their intended use temperature, and have characteristics that make them suitable for use in energy storage devices, such as secondary lithium batteries, and particularly lithium metal batteries. The electrolytes have high stability towards lithium, and provide long cycle life with a lithium metal electrode.

Consequently, the present invention also provides energy storage devices, such as secondary lithium batteries comprising the electrolyte as described above.

In general terms, the secondary lithium battery may comprise:
- a battery case;
- battery terminals;
- a negative electrode;
- a positive electrode;
- a separator for separating the negative electrode from the positive electrode; and
- the electrolyte as described herein.

In the case where both positive and negative electrodes include Li-intercalation materials, the battery is referred to as a lithium-ion battery.

The characteristics of the electrolytes also malts them suitable for use in supercapacitors and asymmetric battery-supercapacitors. The present application also provides such devices containing the electrolyte as described herein.

The present application further provides for the use of the room temperature ionic liquids described above as electrolytes for energy storage devices in which the electrolyte is liquid at the temperature of use of the device.

Suitable methods for charging and conditioning the energy storage devices, batteries or cells to improve the cycling rate and cycle life of the devices, batteries or cells have also been identified. The charging method comprises charging, for at least a part of the charging stage (i.e. for at least 5 minutes), at a charge rate of less than 0.25 mAcm$^{-2}$. The conditioning method comprises the steps of discharging and recharging the device, battery or cell, wherein the recharging is conducted at a rate of less than 0.25 mAcm$^{-2}$ for at least a part of the recharging stage.

The present invention further provides a method for preparing an electrolyte, comprising adding lithium ions in the form of a salt to said room temperature ionic liquid, mixing and drying under vacuum at elevated temperature.

DETAILED DESCRIPTION OF THE INVENTION

Figure 1:
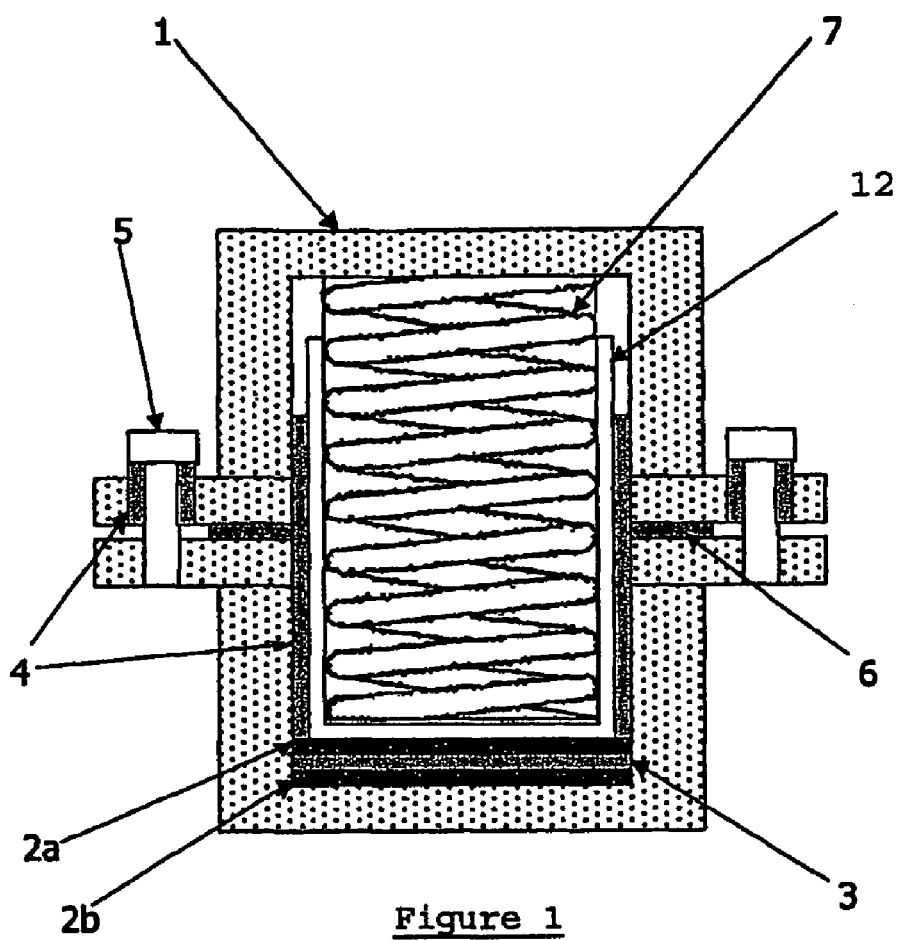
FIG. 1 is a schematic view of a battery-like cell in accordance with one embodiment of the invention.

The features of embodiments of the present invention will now be described in further detail.

Room Temperature Ionic Liquids

Room temperature ionic liquids (RTILs) are organic ionic salts having a melting point below the boiling point of water (100° C.). The RTILs of the present application need to have a melting point such that the ionic salt will be in liquid form at the temperature of operation of the device. Those having melting points of 10° C. or less are preferred. The liquid form is necessary to provide high enough conductivity. Use of RTILs that are solid at the operating temperature are not sufficiently conductive.

In the context of the present application, the term "liquid" is used broadly to encompass gels, which have conductivity similar to liquids, but not to solids.

In addition to the high conductivity, the RTILs possess a wide electrochemical window, high thermal stability, low safety hazards (non-flammable, non-volatile), and low toxicity. The salts obtain their liquid character from the properties of the anions and cations of which they are comprised.

The factors which contribute to the liquid nature of the RTIL are well described in the literature: J. D. Holbrey and K. R. Seddon, *Clean Products and Processes,* 1, 0223 (1999); P. Bonhote, A. P. Dias, N. Papageorgiou, M. Armand, K. Kalyanasundaram and M. Gratzel, *Inorg. Chem.,* 35, 1168 (1996).

Pyrrolidinium Cation

The term "pyrrolidinium cation" refers to cations of formula I, of the general pyrrolidinium structure, or derivatives thereof which may not strictly be considered to be "pyrrolidiniums". Examples of such derivatives are the phosphorous based analogues described below.

The cations of Formula I encompassed by the present application fall into a number of subclasses. Before describing these subclasses, we provide further explanation of the terms used in Formula I.

The term "alkyl" is used in its broadest sense to refer to any straight chain, branched or cyclic alkyl groups of from 1 to 20 carbon atoms in length and preferably from 1 to 10 atoms in length. The term encompasses methyl, ethyl, propyl, butyl, s-butyl, pentyl, hexyl and so forth. The alkyl chain may also contain hetero-atoms, a halogen, a nitrile group, and generally other groups or ring fragments consistent with the substituent promoting or supporting electrochemical stability and conductivity.

Halogen, halo, the abbreviation "Hal" and the like terms refer to fluoro, chloro, bromo and iodo, or the halide anions as the case may be.

R3, R4, R5 and R6 can be any of the groups identified above, but is most suitably H or halo (based on the fact that the pyrrolidinium cation may be partially or fully halogenated, as described in further detail below). The expression "any other group" encompasses any substituent or ring fragment consistent with the substituent promoting or supporting electrochemical stability and conductivity.

R1 is preferably methyl, or partially or fully halogenated methyl (based on the fact that the pyrrolidinium cation may be partially or fully halogenated, described below). It will be understood that R1 cannot generally be H, as this may result in reduced electrochemical stability.

X may be N, in which case the cation is a pyrrolidinium cation, or it may be P, in which case the cation is the phosphonium salt. On the basis of its availability N is typically used, although the function of the phosphonium analogue can be predicted to be very similar to that of the pyrrolidinium cation. Similarly, X may be As, in which case an arsolanium analogue is obtained.

The cation of Formula I may be partly or fully halogenated. Chemical modification of this class of cations is a well-explored field, and is known to be a suitable technique for modifying the electrochemical stability and conductivity of the cation. It also impacts on the melting point of the ionic salt of the cation and anion, thus enabling a selection of a suitable ionic salt having the necessary melting point to be made.

The fluorinated cation may in some cases be obtained by alkylation of a suitable perfluorinated precursor (e.g., from a perfluorinated pyrrolidine), which can be obtained from commercial source. Alternatively, a perfluoroalkyl substituted pyrrolidinium can be obtained by the reaction of a suitable perfluorinated alkyl halide with pyrrolidine as demonstrated by Singh et al.[1] Other methods allowing direct fluorination of the RTIL electrolyte can also be applied.[2]

REFERENCES

1. R. P. Singh, S. Manandhar and J. M. Shreeve, *Tetrahedron Lett.*, 43, 9497 (2002).
2. M. Kobayashi, T. Inoguchi, T. Iida, T. Tanioka, H. Kumase and Y. Fukai, *J. Fluorine Chem.*, 120, 105 (2003).

The identity of R2 can impact significantly on the melting point of the room temperature ionic liquid. R2 is preferably an alkyl of 2 or more carbon atoms, more preferably three or more carbon atoms, and is suitably iso-propyl or an alkyl of 4 or more carbon atoms. When R2 is butyl, the melting point is most appropriate for standard ambient temperature applications (eg 10-25° C.), whereas shorter carbon chain lengths in this position tend to lower the melting point, making the electrolyte only suitable for higher temperature applications.

Conventional devices stop operating at higher temperatures. Thus, the use of the defined room temperature ionic liquids in electrolytes which are capable of functioning at higher temperatures, or lower temperatures, depending on the selection of the substituents on the cation, provides a significant advance over the prior art. By suitable choice of the electrolyte components, the device may operate in the temperature range of from −30° C. to 200° C. Lower end temperature devices would suitably operate in the 0-50° C. region, and higher temperature devices in the 40°-150° C. region.

The bis(trifluoromethylsulfonyl)amide salts of N-ethyl N-methylpyrrolidinium bis(trifluoromethylsulfonyl)amide melt at 86° C., N-prepyl N-methylpyrrolidinium bis(trifluoromethylsulfonyl)amide at 13° C. and N-butyl N-methylpyrrolidinium bis(trifluoromethylsulfonyl)amide at −18° C., in the absence of Li salt or other additives. The melting points vary with additives, but are most often lower. Thus, the appropriate cation can be selected to provide an electrolyte composition that is liquid and has the required stability and cycle life for a given application, at a given temperature range.

Anion

The term "anion" is used broadly to refer to any organic or inorganic anion forming a salt with the cation. The choice of anion is principally based on the salt of the anion and the cation being liquid at the intended use temperature. In addition, the choice of anion will be based upon the anion having sufficient electrochemical stability for the chosen electrodes of the energy storage device.

The anion associated with the cation(s) may for instance be selected from one or more of the following:

(i) $BF_4^-$ and perfluorinated alkyl fluorides of boron. Encompassed within the class are anions of the formula $B(C_xF_{2x+1})_aF_{4-a}^-$ where x is an integer between 0 and 6, and a is an integer between 0 and 4.

(ii) Halides, alkyl halides or perhalogenated alkyl halides of group VA(15) elements. Encompassed within this class are anions of the formula $E(C_xY_{2x+1})_a(Hal)_{6-a}^-$ where a is an integer between 0 and 6, x is an integer between 0 and 6, y is F or H, and E is P, As, Sb or Bi. Preferably E is P or Sb. Accordingly this class encompasses $PF_6^-$, $SbF_6^-$, $P(C_2F_5)_3F_3^-$, $Sb(C_2F_5)_3F_3^-$, $P(C_2F_5)_4F_2^-$, $AsF_6^-$, $P(C_2H_5)_3F_3^-$ and so forth.

(iii) $C_xY_{2x+1}SO_3^-$ where x=1 to 6 and y=F or H. This class encompasses $CH_3SO_3^-$ and $CF_3SO_3^-$ as examples.

(iv) sulfonyl amides, including the bis amides and perfluorinated versions thereof. This class includes $(CH_3SO_2)_2N^-$, $(CF_3SO_2)_2N^-$ (also abbreviated to $Tf_2N$) and $(C_2F_5SO_2)_2N^-$ as examples. The bis amides within this group may be of the formula $(C_xY_{2x+1}SO_2)_2N^-$ where x=1 to 6 and y=F or H.

(v) $C_xF_{2x+1}COO^-$, including $CF_3COO^-$ (vi) sulfonyl and sulfonate compounds, namely anions containing the sulfonyl group $SO_2$, or sulfonate group $SO_3^-$ not covered by groups (iii) and (iv) above. This class encompasses aromatic sulfonates containing optionally substituted aromatic (aryl) groups, such as toluene sulfonate and xylene sulfonate (vii) cyanamide compounds and cyano group containing anions, including cyanide, dicyanamide and tricyanomethide (viii) Succinamide and perfluorinated succinamide (ix) Ethylendisulfonylamide and its perfluorinated analogue (x) $SCN^-$ (xi) Carboxylic acid derivatives, including $C_xH_{2x+1}COO^-$ where x is as defined above (xii) Weak base anions (xiii) Halide ions such as the iodide ion Amongst these anions, the preferred classes are those outlined in groups (i), (ii), (iii), (iv) and (vi) above.

However, should they be disclosed in the prior art, according to one particular embodiment, where the room temperature ionic liquid contains only one type of cation of Formula I with that cation being N-methyl-N-ethylpyrrolidinium or N-methyl-N-propylpyrrolidinium, and the electrolyte contains no additives, the anion is selected to be other than $N(CF_3SO_2)_2^-$, $CF_3SO_3^-$, $N(C_2F_5SO_2)_2^-$, $BF_4^-$ and $PF_6^-$. These specific room temperature ionic liquids are typically more solid or waxy at lower temperatures. In contrast, room temperature ionic liquids based on N-methyl-N-butylpyrrolidinium as the single cation of Formula I have a lower melting point and are demonstrated to operate well in the applications described herein, even without additives.

Description of Abbreviations used to Name Compounds

In the following description and claims, abbreviations are used to name the compounds. For cations of Formula I containing N as the atom X (ie pyrrolidinium-based cations), the prefix P is used. Two numbers follow this to refer to the number of carbon atoms of each of the substituents; thus P13 refers to the methyl propyl pyrrolidinium cation. Some anions are also commonly referred to by abbreviations, with one notable one used below being Tf, used to refer to triflurom-ethylsulfonyl; with the result that $(Tf)_2N$ refers to bis(trifluoromethylsulfonyl)amide. In the literature the term "amide" and "imide" are often used interchangeably, and in fact refer to the same ligand.

Use of Mixtures of Room Temperature Ionic Liquids

The electrolyte may comprise a combination of two different room temperature ionic liquids. These may be referred to as the "first" room temperature ionic liquid, which is based on a cation of Formula I, and an anion, and the "second" room temperature ionic liquid. The second RTIL may be of any type, and therefore the cation component may be an ammonium cation, an imidazolium cation, a pyrrolidinium cation, a morpholinium cation, a pyridinium cation, a guanadinium cation, a piperidinium cation or a phosphorous-based derivative of the cations described above containing a nitrogen atom. According to one suitable embodiment, the second RTIL also comprises a cation of Formula I, although the second RTIL overall must be of a different identity to the first RTIL.

The advantage of a mixture of RTILs in the electrolyte is that the mixture will lower the melting point, thereby making the electrolyte more suitable for broader temperature range applications. In addition, a mixture may also enhance conductivity and, in some cases, electrochemical stability. As one example of a suitable mixture, the combination of N-methyl-N-propyl-pyrrolidinium bis (trifluoromethanesulfonyl) amide and N-methyl-N-butyl-pyrrolidinium bis (trifluoromethanesulfonyl) amide is mentioned.

Additives

There are two main classes of additives that may be useful in the electrolyte of the present application. They are the solid electrolyte interphase-forming additives, and the gelling additives.

(a) Solid Electrolyte Interphase-Forming Additives

The solid electrolyte interphase (SEI) is a surface formed on the lithium electrode in a lithium metal secondary cell. The SEI is a passivation layer that forms rapidly because of the reactive nature of lithium metal. The SEI has a dual role:

1. It forms a passivating film that protects the lithium surface from further reaction with the electrolyte and/or contaminants.

2. The SEI acts as a lithium conductor that allows the passage of charge, as lithium ions, to and from the lithium surface during the charge/discharge cycling of a lithium metal secondary cell.

The SEI is generally made up of a variety components. Usually, some "native" components are present due to exposure to atmospheric contaminant at some point in the fabrication process. Once the cell has been fabricated, the electrolyte will usually react to form additional components in the SEI, which are reduction products of the electrolyte (which may be thought of as a solvent) and/or salt. In some of the examples presented below, the RTIL consisted of $P_{1x}(Tf)_2N$. The spectroscopic evidence indicated that the SEI was formed from reduction products of the $(Tf)_2N^-$ anion. The reduction of just one component of the electrolyte appears to impart favourable cycling properties to the lithium electrode in these electrolytes. However, the use of an additive consisting of selected components is predicted to contribute to the SEI, and therefore according to one embodiment a SEI-forming additive may be used.

SEI-forming additives may be selected from the group consisting of:

polymers, including the electroconductive polymers, such as polyvinylpyrrolidone, polyethylene oxide, polyacrylonitrile, polyethylene glycols, the glymes, perfluorinated polymers; and salts, preferably magnesium iodide, aluminium iodide, tin iodide, lithium iodide, tetraethylammonium heptadecafluorooctanesulfonate, dilithiumpthalocyanine, lithium heptadecafluorooctanesulfonate, tetraethylammonium fluoride-tetrakis hydrogen fluoride.

(b) Gelling Additives

Gelling additives may be used to impart gel properties. Gels may be considered to be "quasi-solids" as they have some structural properties, but retain the conductive properties of the liquid. Consequently gels are within the scope of the term "liquid" in the present application.

The gelling additives may be selected from inorganic particulate materials (sometimes referred to as nanocomposites, being fine particulate inorganic composites). Amongst these, examples are $SiO_2$, $TiO_2$ and $Al_2O_3$.

Polymer or polymerizable monomer components may also be used to gel the RTIL into an elastomeric material. Polymers useful for such a purpose include methylmethacrylate, dimethylaminoacrylamide and dimethylaminoethylacrylamide. Lithium polyelectrolyte salts can also be used for this purpose.

Counterion

The lithium ions are generally incorporated into the electrolyte by the addition of a lithium salt, consisting of lithium ions and counterions, to the room temperature ionic liquid. Once added, the lithium ions and counterions dissociate, and are effectively a solute to the room temperature ionic liquid solvent. If the counterions are the same as the anion of the room temperature ionic liquid, then the lithium addition can be considered to be doping of the electrolyte. In other words, doping can be considered as a cation substitution. Alternatively a different counterion can be used. The counterion can be within the classes (i) to (xiii) listed above for the anions, or may be any other counterion for lithium, including polyanions. Generally, however, the counterion for the lithium will be one or more ions selected from classes (i) to (xiii).

The concentration of lithium (or dopant) can be between 0.01% and 90% of the overall material by weight, preferably between 1 and 49% by weight. It is generally simpler to refer to the lithium concentration of the electrolyte in moles of lithium ions per kilogram of total electrolyte, and in this unit the lithium is suitably present in an amount of from 0.01 to 2.0 mol/kg, preferably 0.1-1.5 mol/kg, and most preferably 0.2-0.6 mol/kg. The result is a liquid at room temperature in the cases of some members of the above salt families. In a most cases a liquid is generated over some temperature region.

Organic Solvent

The electrolyte may comprise any number of further components, one example being an organic solvent. Preferred organic solvents are water immiscible organic solvents. When present, the organic solvent may be used in an amount of 0-90 wt %, preferably 10-70 wt %.

Preparation of the Electrolyte

The electrolytes described in the invention are preferably prepared by adding lithium salt to the room temperature ionic liquid (or molten plastic crystal), mixing and drying under vacuum at elevated temperature. Preferably the electrolyte is then degassed, for examples by contacting with a stream of dry argon, to remove dissolved gases and residual water.

Energy Storage Devices

The term energy storage device encompasses any device that stores or holds electrical energy, and encompasses batteries, supercapacitors and asymmetric (hybrid) battery-supercapacitors. The term battery encompasses single cells.

Lithium based energy storage devices are ones that contain lithium ions in the electrolyte.

Lithium battery encompasses both lithium ion batteries and lithium metal batteries.

Lithium ion batteries and lithium metal batteries are well known and understood devices, the typical general components of which are well known in the art of the invention.

Secondary lithium batteries are lithium batteries which are rechargeable. The combination of the electrolyte and negative electrode of such batteries must be such as to enable both plating/alloying (or intercalation) of lithium onto the electrode (i.e. charging) and stripping/de-alloying (or de-intercalation) of lithium from the electrode (i.e. discharging). The electrolyte is required to have a high stability towards lithium, for instance approaching ~0V vs. $Li/Li^+$. The electrolyte cycle life is also required to be sufficiently good, for instance at least 100 cycles (for some applications), and for others, at least 1000 cycles.

Secondary Lithium Batteries

The general components of a secondary lithium battery are well known and understood in the art of the intention. The principal components are:

a battery case, of any suitable shape, standard or otherwise, which is made from an appropriate material for containing the electrolyte, such as aluminium or steel, and usually not plastic;

battery terminals of a typical configuration;

a negative electrode;

a positive electrode;

a separator for separating the negative electrode from the positive electrode; and an electrolyte (in this case, the electrolyte described above).

The negative electrode comprises a metal substrate, which acts as a current collector, and a negative electrode material. The negative electrode material can be lithium metal, a lithium alloy forming material, or a lithium intercalation material; lithium can be reduced onto/into any of these materials electrochemically in the device.

The metal substrate underlying the lithium can be of importance in determining the cycle performance of the cell. This element may also have the role of current collector in the cell. The metal substrate may be any suitable metal or alloy, and may for instance be formed from one or more of the metals Pt, Au, Ti, Al, W, Cu or Ni. Preferably the metal substrate is Cu or Ni.

The negative electrode surface may be formed either in situ or as a native film. The term "native film" is well understood in the art, and refers to a surface film that is formed on the electrode surface upon exposure to a controlled environment prior to contacting the electrolyte. The exact identity of the film will depend on the conditions under which it is formed, and the term encompasses these variations. The surface may alternatively be formed in situ, by reaction of the negative electrode surface with the electrolyte. The use of a native film is preferred.

The positive electrode is formed from any typical lithium intercalation material, such as a transition metal oxides and their lithium compounds. As known in the art, transition metal oxide composite material is mixed with binder such as a polymeric binder, and any appropriate conductive additives such as graphite, before being applied to or formed into a current collector of appropriate shape.

Any typical separator known in the art may be used, including glass fibre separators and polymeric separators, particularly microporous polyolefins.

Usually the battery will be in the form of a single cell, although multiple cells are possible. The cell or cells may be in plate or spiral form, or any other form. The negative electrode and positive electrode are in electrical connection with the battery terminals.

Other Devices

The high conductivity and high electrochemical stability that have been noted in the deployment of these electrolytes in secondary lithium batteries, demonstrate that these same electrolytes will function well in energy storage devices such as supercapacitors and asymmetric (hybrid) battery-supercapacitor devices. For the asymmetric device, one of the lithium battery electrodes (either the positive or the negative) is replaced with a supercapacitor electrode. For a supercapacitor, both lithium battery electrodes are replaced by supercapacitor electrodes. Supercapacitor electrodes, by comparison with lithium battery electrodes, are relatively simple structures at which the interaction with the electrolyte is simply an electrostatic charging and discharging of the electrochemical double layer. Supercapacitors are also commonly known as electrochemical double-layer capacitors (EDLCs). Suitable electrolytes for supercapacitors are, like those described here, electrolytes with high ionic conductivity and high electrochemical stability (large voltage range).

In its general form, a supercapacitor comprises:

a device case;

terminals for electrical connection;

a negative electrode, which is generally composed of a mixture of conductive carbon and highly activated (high surface area) carbon which are bound to a metallic substrate (current collector);

a positive electrode, which is generally composed of a mixture of conductive carbon and highly activated (high surface area) carbon which are bound to a metallic substrate (current collector);

a separator for maintaining physical separation of the negative and positive electrode; and the electrolyte as described herein.

The negative and positive supercapacitor materials and methods for manufacture are well known and understood in the art of the invention.

Asymmetric (hybrid) battery-supercapacitors are devices in which one battery electrode is combined with one supercapacitor electrode to yield an energy storage device which has properties that are intermediate between those of batteries and supercapacitors. In its general form, an asymmetric battery-supercapacitor comprises:

a device case;

terminals for electrical connection;

a negative electrode;

a positive electrode;

a separator for maintaining physical separation of the positive and negative electricity; and the electrolyte as described herein, wherein one of said negative electrode and positive electrode is a battery electrode, and the other electrode is a supercapacitor electrode.

The nature and composition of the battery and supercapacitor electrodes are fully described above, and are of the form and composition well known in the art. If the negative electrode is a battery negative electrode, such as a lithium intercalation material or a lithium metal electrode, then the positive electrode is a supercapacitor positive electrode, typically a high surface area carbon electrode material bonded to a metal substrate. If the negative electrode is a supercapacitor electrode, typically a high surface area carbon electrode material bonded to a metal substrate, then the positive electrode is a battery electrode, such as one that contains a lithium intercalation material.

For supercapacitors, the electrolyte may contain some lithium ions, but need not do so. Accordingly, in this embodiment of the invention, the presence of lithium ions is optional.

Charging and Conditioning of Device

In the case of a lithium metal battery, the initial rate of deposition of lithium onto the substrate is also of importance in developing long cycle life batteries. Preferably the initial deposition rate is less than 0.5 mAcm$^{-2}$ and most preferably less than 0.25 mAcm$^{-2}$ during at least a part of the charging stage of the device, battery or cell. The device battery or cell is suitably charged at this rate for a period of not less than 5 minutes during the charging stage. Charge-discharge cycling can then take place at a higher rate.

Conditioning is a method used to influence the surface properties of the electrodes, and particularly the negative electrode. The device, battery or cell is suitably conditioned by subjecting the device, battery or cell to successive discharging and recharging steps, wherein the recharging is conducted at a rate of less than 0.5 mAcm$^{-2}$ (preferably less than 0.25 mAcm$^{-2}$) for at least a part of the recharging stage. Preferably that period is not less than 5 minutes duration.

EXAMPLES

The present invention will now be described in further detail with reference to the following non-limiting Examples.

Materials and Preparation

Room Temperature Ionic Liquids

Room temperature ionic liquids containing X=N in the ring structure were prepared in accordance with the procedure described in MacFarlane et al. "Pyrrolidinium Imides: a New Family of Molten Salts and Conductive Plastic Crystal Phases", *Journal of Physical Chemistry* B, 103 (99) 4164-4170.

The preparation of the phospholanium salts (X=P) requires the synthesis of a phospholane precursor, although it is noted that the six-membered phosphorinane and the corresponding phosphorinanium salt could be prepared. The phospholane precursor can be synthesised from trimethylphosphite according to the scheme outlined below, as described by Emrich and Jolly. [1]

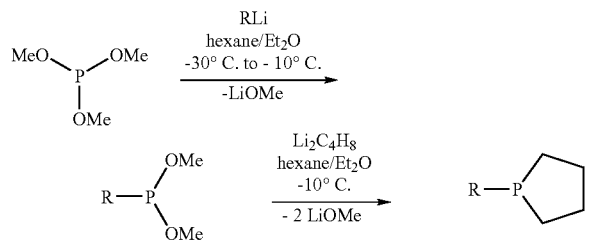

Alternative methods could be used, involving, for example, the reduction of phospholane oxide with phenylsilane, [2] the simultaneous addition of a bis-Grignard reagent and benzothiadiphosphole, [3] or the reaction of aluminacyclopentanes in the presence of Cp$_2$ZrCl$_2$ catalyst, copper halides and dichloroalkylphosphine. [4]

The phospholane can be converted to a quaternary phosphonium species through reaction with the appropriate alkyl halide (alkylation) to form the alkyl phospholanium halide salt, as shown below (where X is a halide e.g., I$^-$, Br$^-$, Cl$^-$ etc.):

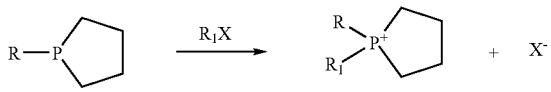

The RTIL can be obtained from the halide precursor by metathesis, with the route being dictated by the relative solubility of the product and by-product. For example, a hydrophobic product (e.g., using Li(Tf)$_2$N) can be obtained by metathesis in aqueous solution, and the product is insoluble in water. [5] Alternatively a hydrophilic product can be obtained by metathesis with a silver salt (e.g., AgDCA) in aqueous solution. The insoluble by-product (e.g., AgI) is removed by filtration and the product is obtained by the evaporation of water at reduced pressure. [6,7]

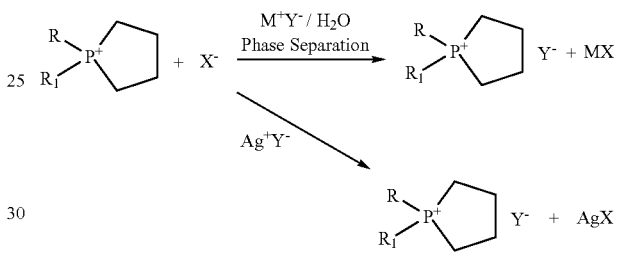

Similarly, As analogues may be prepared according to Reference [8].

1. P. Emrich and P. W. Jolly, *Synthesis*, 1, 39 (1993).
2. K. L. Marsi, *J. Am. Chem. Soc.*, 91, 4724 (1969).
3. G. Baccolini, C. Boga and U. Negri, *Synlett*, 2000, 1685 (2000).
4. U. M. Dzhemilev, A. G. Ibragimov, R. R. Gilyazev and L. O. Khafizova, *Tetrahedron*, 60, 1281 (2004).
5. D. R. MacFarlane, P. Meakin, J. Sun, N. Amini and M. Forsyth, *J. Phys. Chem.* B, 103, 4164 (1999).
6. D. R. MacFarlane, J. Golding, S. Forsyth, M. Forsyth and G. B. Deacon, *Chemical Communications* 1430 (2001).
7. J. Golding, S. Forsyth, D. R. MacFarlane, M. Forsyth and G. B. Deacon, *Green Chemistry*, 4, 223 (2002).
8. J. B. Lambert and H. Sun *J. Org. Chem.* 42, 1315 (1977).

Electrolytes

These were prepared by adding the required amount of the dried lithium salt specified in the example (available commercially) to the required amount of room temperature ionic liquid. The lithium salt was allowed to dissolve at 50° C. overnight. Unless otherwise stated, the counterion to lithium in the lithium salt is the anion of the room temperature ionic liquid.

Battery-Like Cells

'Battery' like cells were fabricated using resealable stainless steel cells which were developed in-house, as illustrated in FIG. 1. The basic design incorporated a case 1, electrodes 2a and 2b, a separator 3 incorporating electrolyte, polypropylene sleeves 4, a socket head screw 5, and a Teflon gasket 6 to seal, and electrically isolate, the two halves of the cell. Stack pressure in the cell was maintained by means of a spring 7 in a piston 12, which applied ~1 kgcm$^{-2}$ stack pressure perpendicular to the electrode surface.

The lower electrode 2b was generally the lithium electrode. This was formed from lithium metal foil (Aldrich 99.9%—thickness 180 μm), which was washed with hexane and brushed with a polyethylene brush. The positive electrode 2a was prepared by coating a foil (either aluminium or platinum) with an active material formulation. The active material (AM), was either $LiCoO_2$ or $LiMn_2O_4$. The electrode coating was prepared by weighing the components in the following ratios;—AM—80%, Graphite ($KS_4$)—7%, Carbon Black—3%, PVdF—10%. The solid components were mixed in a mortar and pestle and a quantity of dimethylacetamide (DMAc ~130%) was added slowly with mixing to form a slurry. The slurry was transferred to a beaker and heated (low heat) with constant stirring until the mixture had reached the correct consistency. The slurry was then applied to the current collector (aluminium or platinum) using the doctor blade technique. The resulting coated foil was then dried at 60° C. for several hours prior to drying under vacuum at 60° C. for greater than 24 hours.

Glass fibre mats or microporous polyolefin sheets were cut to size and used as the separators.

The cells were assembled (in an Argon glovebox) by placing an electrode 2b in the case 1, adding a separator 4 (already wetted with electrolyte) and by finally placing the second electrode 2a. The cells were sealed in the glovebox and could then be removed for testing.

3-Electrode Cells

Figure 2:
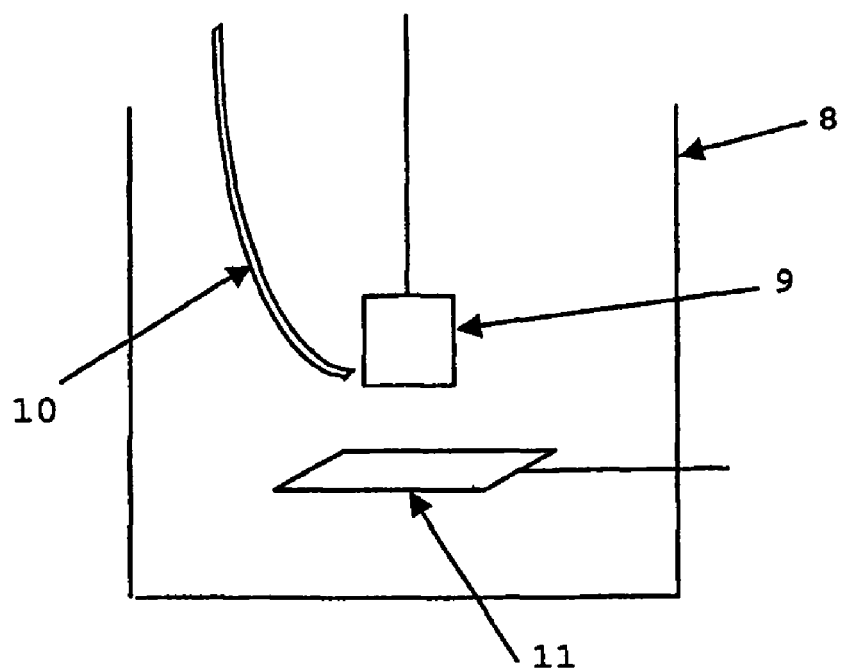
FIG. 2 is a schematic view of a 3-electrode cell used to conduct testing of the electrolytes.

The electrochemical measurements were performed in a 3-electrode cell 8, consisting of a platinum (or copper) working electrode (WE) 9, a lithium quasi-reference electrode (RE) 10, and a lithium counter electrode (CE) 11. The cell is shown schematically in FIG. 2.

For the cyclic voltammetry measurements the potential (vs. $Li/Li^+$) was scanned from 2000 mV to −500 mV and back to 2000 mV at a rate of 100 $mVs^{-1}$. The current response of the working electrode was recorded throughout the experiment. At low potentials (<~0 mV vs. $Li/Li^+$), $Li^+$ is reduced to Li(s) and is deposited on the electrode producing a negative current (corresponding to charging a Li metal cell). When the scan is reversed and the potential rises above ~0 mV (vs. $Li/Li^+$) Li(s) is oxidised to $Li^+$ (dissolution), producing a positive current (corresponding to discharging a Li metal cell). Integrating the curves provides a measure of the amount of charge deposited (reduced $Li^+$) and the amount of charge stripped (oxidised Li(s)). In this case the ratio of [oxidised Li(s) reduced $Li^+$] provides a measure of the efficiency of the deposition/dissolution process. An efficiency of less than 100% indicates that the deposited lithium has reacted with the electrolyte and/or contaminants to produce a product that is not electrochemically reversible.

Cycling Efficiency Measurements

The cycling efficiency measurements were made using the 3-electrode cell described above. A deposit of lithium was galvanostatically plated onto the surface of the working electrode followed by cycling of a fraction of the original excess. The number of cycles required to consume the original excess (indicated by a sharp change in dissolution potential) was used to calculate the 'average cycling efficiency' of the electrolyte. All cycling efficiency values were determined at 50° C. in ~0.5 mL of electrolyte. The cycling efficiency is defined by:

$$\text{Avg. Cyc. Eff.} = 100 \times NQ_{ps}/(NQ_{ps}+Q_{ex}) \quad [2]$$

where N is the number of cycles, $Q_{ex}$ is the plated excess (1 $Ccm^{-2}$) and $Q_{ps}$ is the cycled fraction (0.25 $Ccm^{-2}$). In the following experiments, references to a charge density of 1.0 $Ccm^{-2}$ refers to the plated excess, and it will be understood that the cycled fraction is 0.25 $Ccm^{-2}$ if not otherwise stated. Such experiments also serve to show the behaviour of the ionic liquid in the practical situation of a cell designed to have a coulombic excess of Li in the negative electrode as compared to the capacity of the positive electrode.

Example 1

Figure 3:
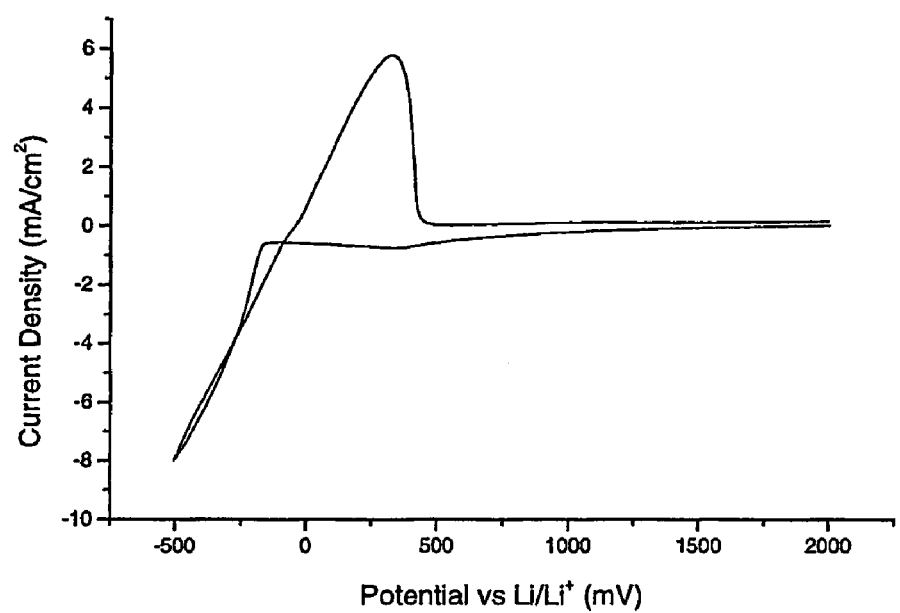
FIG. 3 is a cyclic voltammogram for a cell containing the electrolyte of one embodiment of the invention as described in Example 1.

The electrochemical stability of a 0.5 mol/kg lithium bis (trifluoromethanesulfonyl)amide in methyl butyl pyrrolidinium bis (trifluoromethanesulfonyl)amide on a lithium electrode deposited on to a Ni substrate is determined by cyclic voltammetry using the 3-electrode cell described above (with Ni working electrode). The test was conducted at 100 $mVs^{-1}$ and at ambient temperature. The results of the test are illustrated in FIG. 3. High reversibility is observed, with no indication of degradation of the electrolyte.

Example 2

Figure 4:
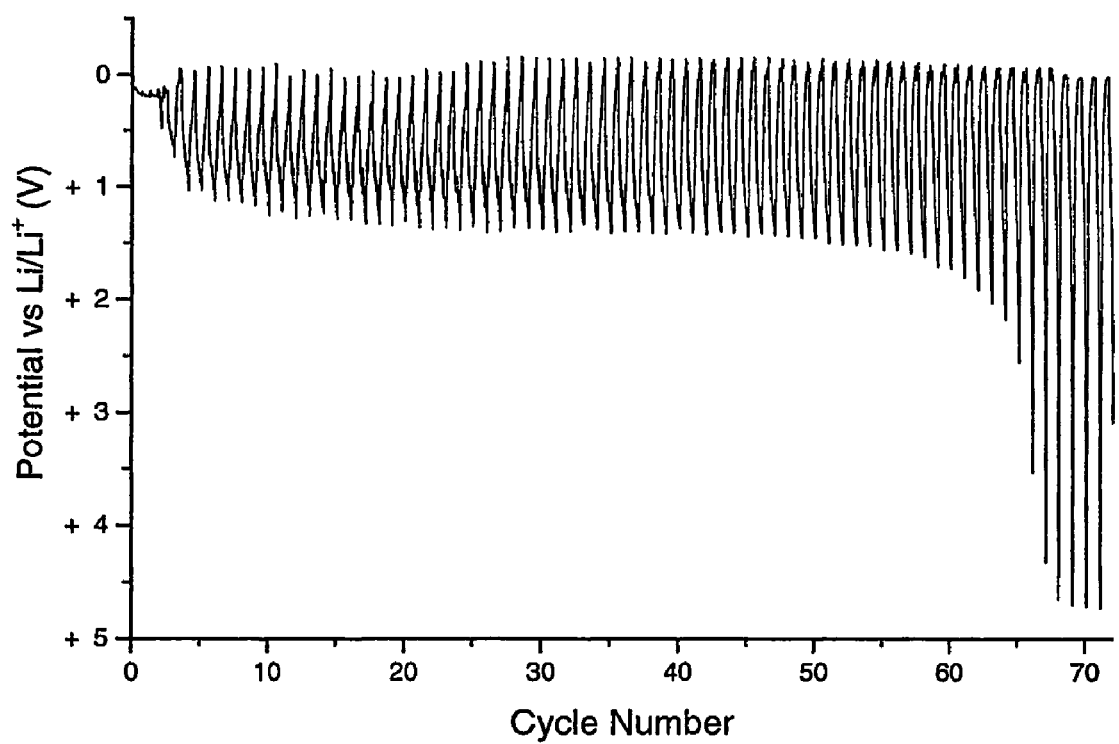
FIG. 4 is a graph of the cycling efficiency of Example 2 conducted at 0.25 mAcm$^{-2}$ and 0.25/1 Ccm$^{-2}$ on Pt at 50° C.

To show the ability of the electrolyte to reversibly cycle lithium a cycling efficiency experiment was conducted. A solution of 0.5 mol/kg lithium bis(trifluoromethanesulfonyl) amide in methyl butyl pyrrolidinium bis (trifluoromethanesulfonyl)amide was made up and a cycling efficiency experiment carried out at 0.25 $mAcm^{-2}$ and 1 $Ccm^{-2}$ (0.25 $Ccm^{-2}$ cycled fraction) on a Pt electrode at 50° C. The electrode cycles for 63 cycles (FIG. 4), indicating a cycling efficiency of 94.0%.

Example 3

Figure 5:
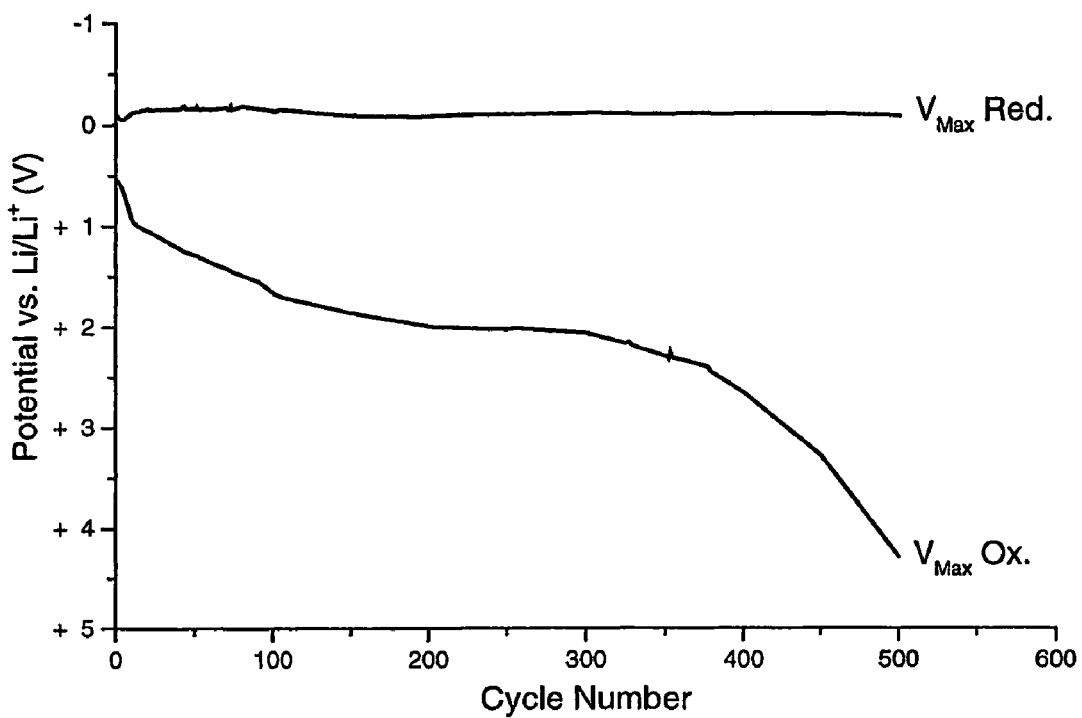
FIG. 5 is a graph of the cycling efficiency of Example 3 conducted at 1.0 mAcm$^{-2}$ and 0.25/1 Ccm$^{-2}$ on Pt at 50° C.

The test of example 2 is repeated on a platinum substrate at the higher rate of 1.0 $mAcm^{-2}$ and 1 $Ccm^{-2}$ (0.25 $Ccm^{-2}$ cycled fraction). The electrode cycles for 430 cycles (FIG. 5), indicating a cycling efficiency of 99.1%. Because of the large number of cycles, only the maximum deposition (reduction) and dissolution (oxidation) potentials for each cycle are shown.

Example 4

Figure 6:
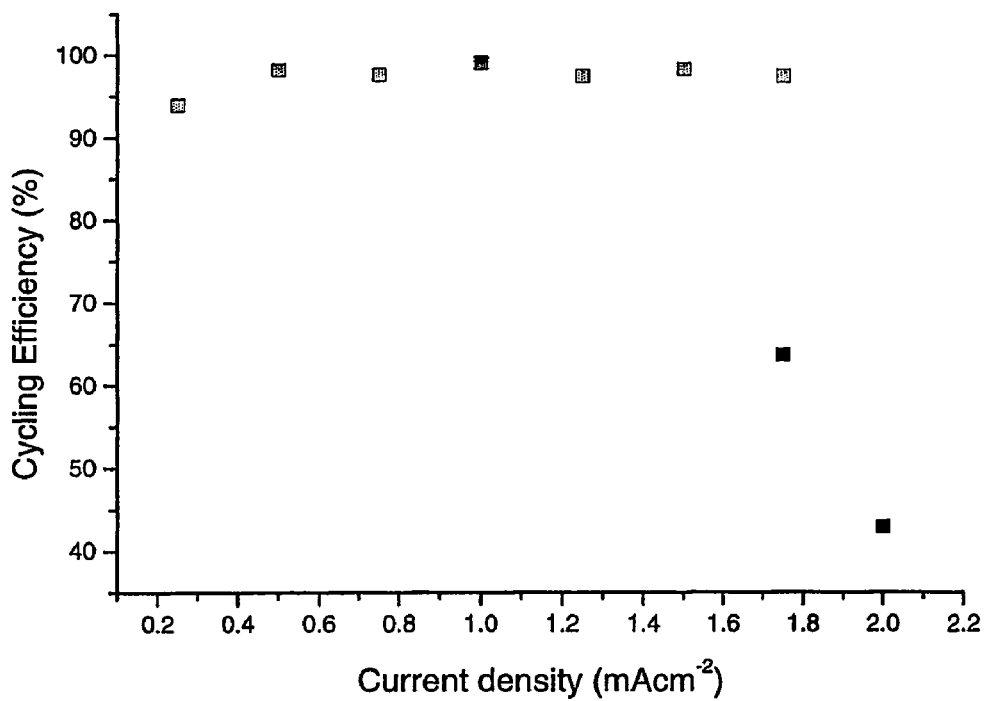
FIG. 6 is a plot showing cycling efficiency of Example 4 conducted at 0.25 mAcm$^{-2}$ on Pt and 0.25/1 Ccm$^{-2}$ at 50° C.

To show the influence of current density (charge/discharge rate), the test of examples 2 and 3 are repeated using varying current densities on Pt. Cycling efficiencies are shown in FIG. 6. These indicate the presence of an upper limit in current density beyond which dendritic deposition morphology occurs.

Example 5

Figure 7:
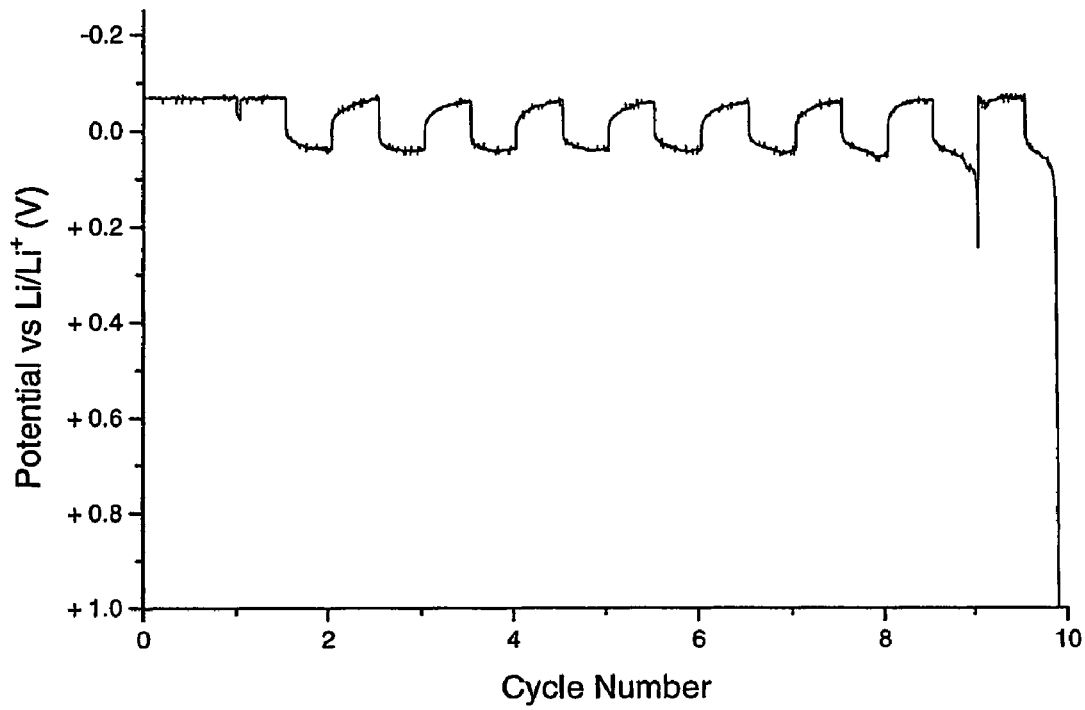
FIG. 7 is a graph of the cycling efficiency of Example 5 conducted at 0.25 mAcm$^{-2}$ and 0.25/1 Ccm$^{-2}$ on Cu at 50° C.

To show the influence of a different substrate, the platinum substrate was substituted with a copper substrate and the test of example 2 repeated with the new substrate. The test was conducted at 0.25 $mAcm^{-2}$ and 1 $Ccm^{-2}$ (0.25 $Ccm^{-2}$ cycled fraction). The electrode cycles for 9 cycles (FIG. 7) indicating a cycling efficiency of greater than 69.2%.

Example 6

Figure 8:
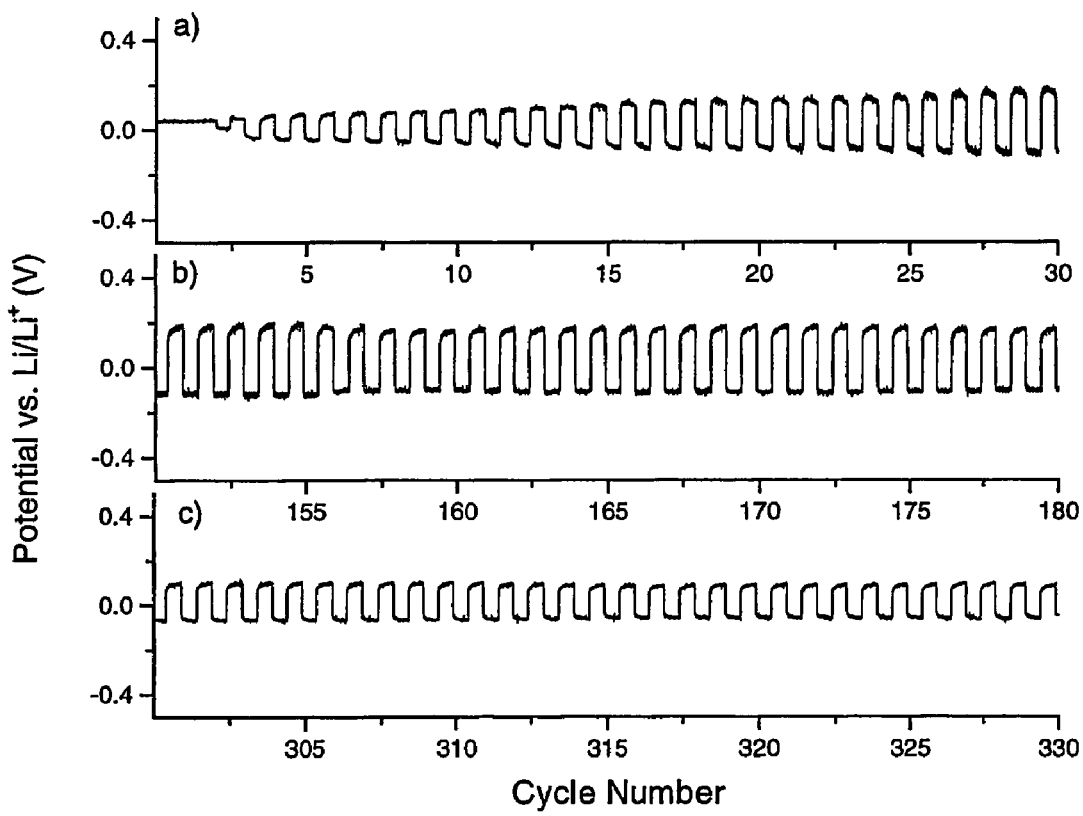
FIG. 8 is a graph of the cycling efficiency of Example 6 conducted at 0.1 mAcm$^{-2}$ and 0.25/1 Ccm$^{-2}$ on Cu at 50° C., with section a) showing the first 30 cycles, b) cycles 150-180 and c) cycles 300-330.

To demonstrate high efficiency on the copper substrate a cycling efficiency experiment was performed at a low rate. The test of example 2 is carried out on a copper substrate at 0.1 $mAcm^{-2}$ and 1 $Ccm^{-2}$. The electrode cycles for 330 cycles (FIG. 8) indicating a cycling efficiency of greater than 98.8%.

Example 7

Figure 9:
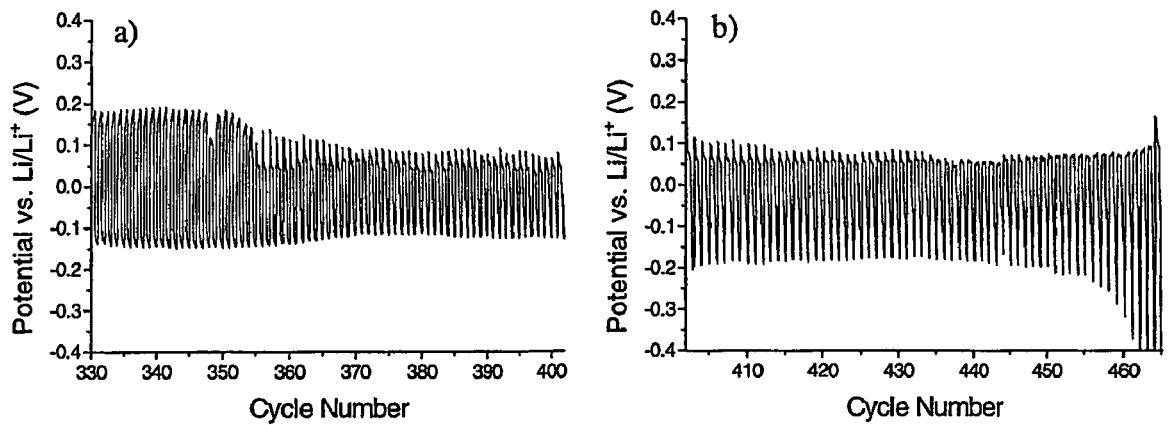
FIG. 9 is graph of the cycling efficiency of Example 7 performed at increased current density as compared with Example 6, with section a) showing 0.25 mAcm$^{-2}$ and b) 0.5 mAcm$^{-2}$.

To demonstrate the effect of prior cycling (conditioning) at low rates, the conditions and materials of example 6 are repeated except that after cycling at the proscribed rates (0.1 mAcm$^{-2}$) for 330 cycles, the rates are increased sequentially (0.25 mAcm$^{-2}$—FIG. 9a, 0.5 mAcm$^{-2}$—FIG. 9b). A cycling efficiency in excess of 99% is obtained.

Example 8

Figure 10:
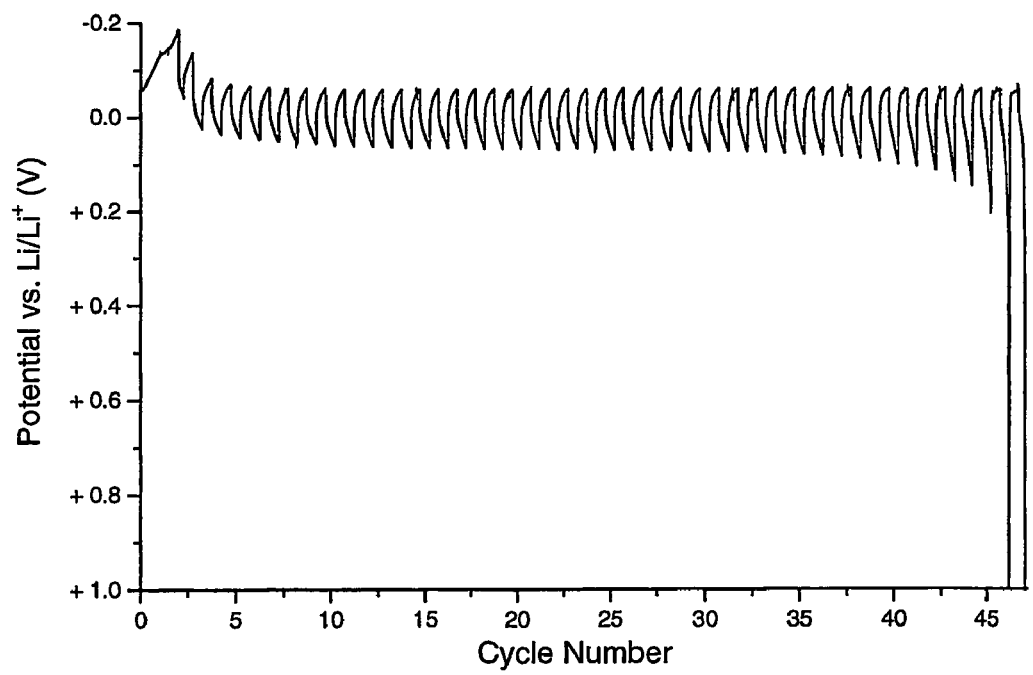
FIG. 10 is a graph of the cycling efficiency of Example 8 conducted at 1.0 mAcm$^{-2}$ and 0.25/1 Ccm$^{-2}$ on Pt at 50° C.

To demonstrate the use of another derivative of the pyrrolidinium series a solution of 0.5 mol/kg lithium bis(trifluoromethanesulfonyl)amide in methyl propyl pyrrolidinium bis(trifluoromethanesulfonyl)amide was made up and a cycling efficiency experiment carried out at 1.0 mAcm$^{-2}$ and 1 Ccm$^{-2}$ on a Pt electrode at 50° C. The electrode cycles for 44 cycles (FIG. 10), indicating a cycling efficiency of 91.7%.

Example 9

The cycling efficiency test generally outlined in example 2 was repeated with changes made to the electrolyte used, additive, lithium salt, salt concentration and/or temperature, combined with the current density outlined in the table. For all experiments a copper substrate was used, and the room temperature ionic liquid was methyl propyl pyrrolidinium bis(trifluoromethanesulfonyl)amide, unless indicated in the left-hand column. Unless otherwise specified in the left-hand column of the table, the lithium salt used was lithium bis(trifluoromethanesulfonyl)amide. The lithium ion (lithium salt) concentration was 0.5 mol/kg unless otherwise stated in brackets in the left column of the table. The results are summarised below.

| Additive or details of variation | Temp. (° C.) | Rate mAcm$^{-2}$ | Number of cycles 1 | 2 | 3 | Cyc. Eff. (%) Av. | Max. |
|---|---|---|---|---|---|---|---|
| PEO (MW 100000 0.2 wt %) | 50 | 1.0 | 9 | 35 | 21 | 84.4 | 89.7 |
| PVP (MW 40000 0.15 wt %) | 50 | 1.0 | 27 | 14 | 10 | 81.0 | 87.1 |
| Tetraglyme (0.2 wt %) | 50 | 1.0 | 9 | 5 | 10 | 66.7 | 71.4 |
| SiO$_2$ (5 wt %) | 50 | 1.0 | 5 | 5 | 3 | 52.0 | 55.6 |
| SiO$_2$ (5 wt %) | 50 | 0.5 | 20 | | | 83.3 | 83.3 |
| MgI$_2$ (1000 ppm) | 50 | 1.0 | 4 | | | 50.0 | 50.0 |
| MgI$_2$ (500 ppm) | 50 | 1.0 | 15 | 7 | 10 | 72.7 | 78.9 |
| MgI$_2$ (100 ppm) | 50 | 1.0 | 6 | 9 | | 64.6 | 69.2 |
| MgI$_2$ (100 ppm) | 50 | 0.5 | 26 | 9 | | 78.0 | 86.7 |
| Variation of Li salt or room temperature ionic liquid examples follow: | | | | | | | |
| LiPF$_6$ (0.5 molkg$^{-1}$) | 50 | 1.0 | <1 | | | <20.0 | <20.0 |
| LiPF$_6$ (0.5 molkg$^{-1}$) | 50 | 0.5 | 3 | 6 | 3 | 48.5 | 60.0 |
| LiAsF$_6$ (0.5 molkg$^{-1}$) | 50 | 1.0 | 1 | | | 20.0 | 20.0 |
| LiAsF$_6$ (0.5 molkg$^{-1}$) | 50 | 0.5 | 43 | 36 | 26 | 89.7 | 91.5 |
| LiAsF$_6$ (1.0 molkg$^{-1}$) | 50 | 0.5 | 61 | | | 93.8 | 93.8 |
| Li(Tf)$_2$N (0.5 molkg$^{-1}$) | 75 | 1.0 | 7 | 4 | 5 | 57.1 | 63.6 |
| Li(Tf)$_2$N (1.0 molkg$^{-1}$) | 50 | 1.0 | 10 | | | 74.2 | 74.2 |
| Li(Tf)$_2$N (1.0 molkg$^{-1}$) | 75 | 1.0 | 13 | | | 76.5 | 76.5 |
| LiAsF$_6$ (1.0 molkg$^{-1}$) | 75 | 1.0 | 49 | 51 | | 92.6 | 92.7 |
| LiAsF$_6$ (1.5 molkg$^{-1}$) | 100 | 0.5 | 36 | 33 | | 89.6 | 90.0 |
| LiAsF$_6$ (1.5 molkg$^{-1}$) | 125 | 1.0 | 28 | | | 87.5 | 87.5 |
| Li(Tf)$_2$N (0.5 molkg$^{-1}$) in P$_{13}$(Tf)$_2$N:P$_{14}$(Tf)$_2$N (1:1) | 50 | 1.0 | 11 | | | 73.3 | 73.3 |

It will be noted that the final example in the table involves the use of a 1:1 mixture of two different room temperature ionic liquids. The physical properties of this mixture and other mixtures of two room temperature ionic liquids makes mixtures an attractive proposition for commercial application.

Example 10

Figure 11:
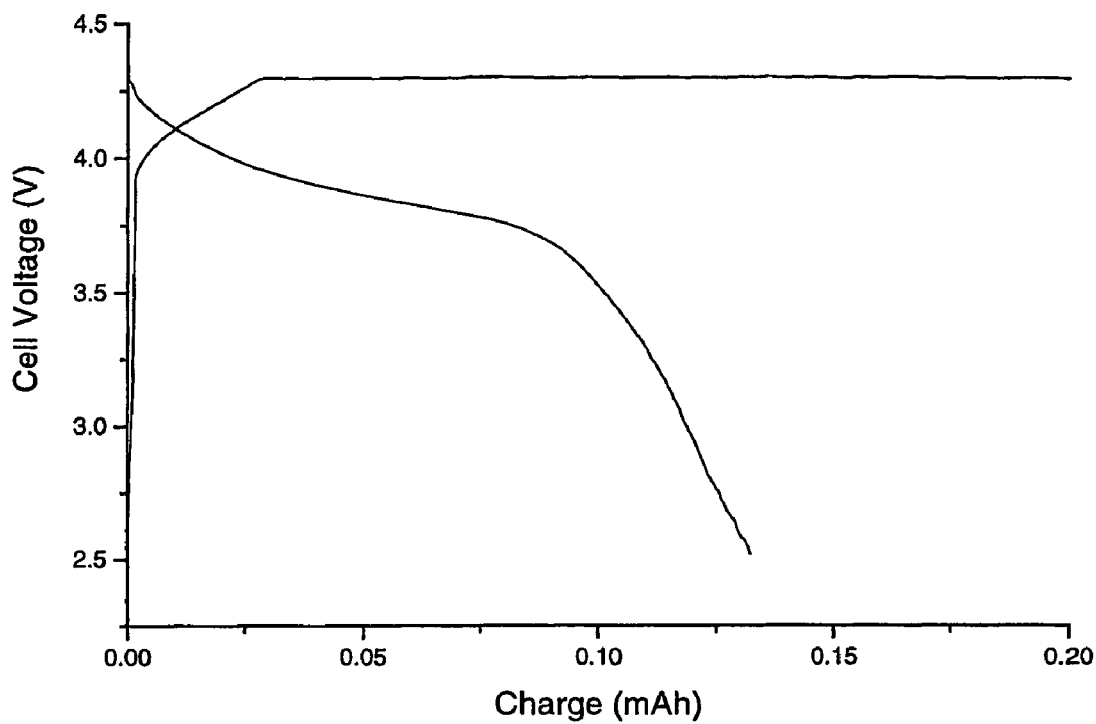
FIG. 11 is a graph demonstrating the charge against cell voltage of the cell described in Example 10.

The electrolyte used in Example 1 was incorporated into a cell as illustrated in FIG. 1. The cell incorporated a lithium negative electrode, a 0.5 molkg$^{-1}$ Li (Tf)$_2$N/P$_{14}$(Tf)$_2$N electrolyte, a Celgard™ separator and a LiMn$_2$O$_4$ positive electrode on an aluminium current collector. The cell was cycled at the C/10 rate (i.e., 10 hours to charge/discharge) at 50° C. The results of the cycling of this cell are presented in FIG. 11.

Example 11

Figure 12:
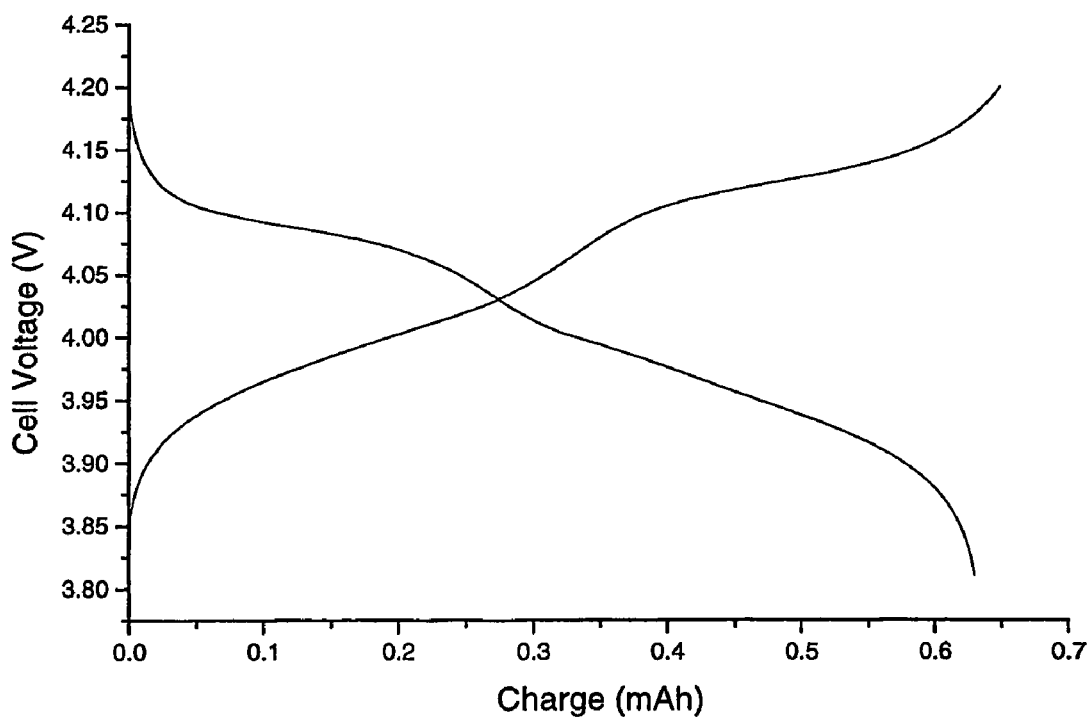
FIG. 12 is a graph demonstrating the charge against cell voltage of the cell described in Example 11.

The electrolyte used in Example 8 was incorporated into the cell as illustrated in FIG. 1. The cell incorporated a lithium negative electrode, a 0.5 molkg$^{-3}$ Li(Tf)$_2$N/P$_{13}$(Tf)$_2$N electrolyte, a glass fibre separator and a LiMn$_2$O$_4$ positive electrode on an platinum current collector. The use of a platinum current collector for the positive electrode improves the capacity retention. The cell was cycled at the C/10 rate (i.e., 10 hours to charge/discharge) at 80° C. The results of the cycling of this cell are presented in FIG. 12.

Example 12

Figure 13:
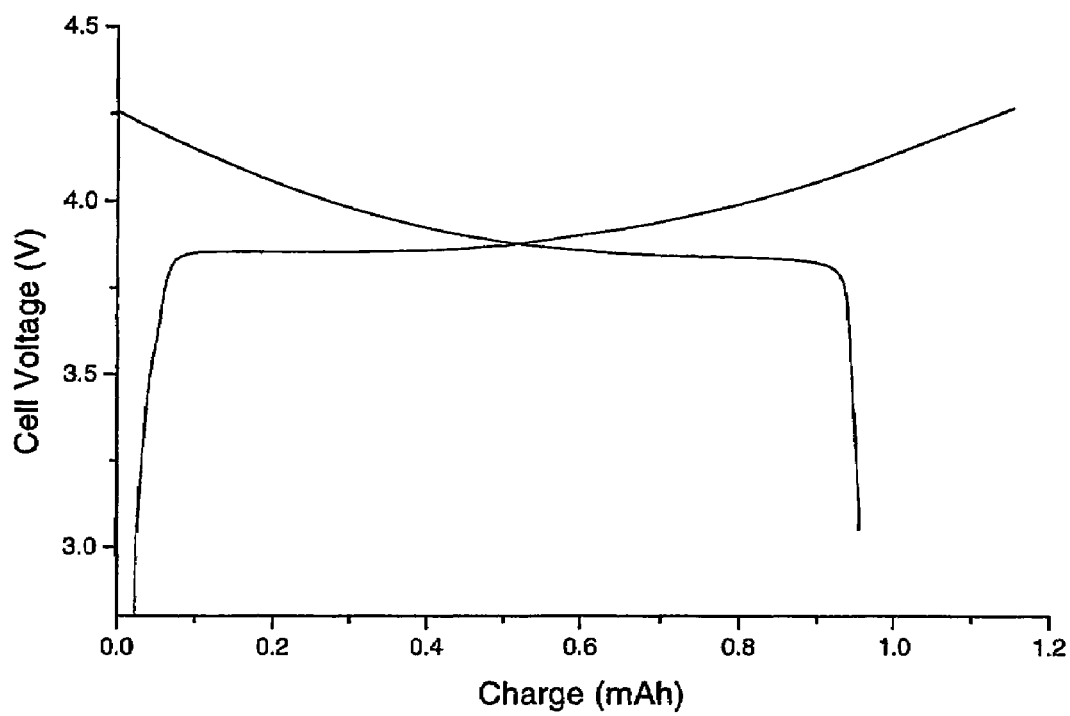
FIG. 13 is a graph demonstrating the charge against cell voltage of the cell described in Example 12.

The cell of Example 11 was modified by substituting the LiMn$_2$O$_4$ positive electrode with a LiCoO$_2$ positive electrode. The cell incorporated a lithium negative electrode, a 0.5 molkg$^{-1}$ Li(Tf)$_2$N/P$_{13}$(Tf)$_2$N electrolyte, a glass fibre separator and a LiCoO$_2$ positive electrode on an platinum current collector. The cell was cycled at the C/10 rate (i.e., 10 hours to charge/discharge) at 80° C. The results of the cycling of this cell are presented in FIG. 13.

Example 13

Figure 14:
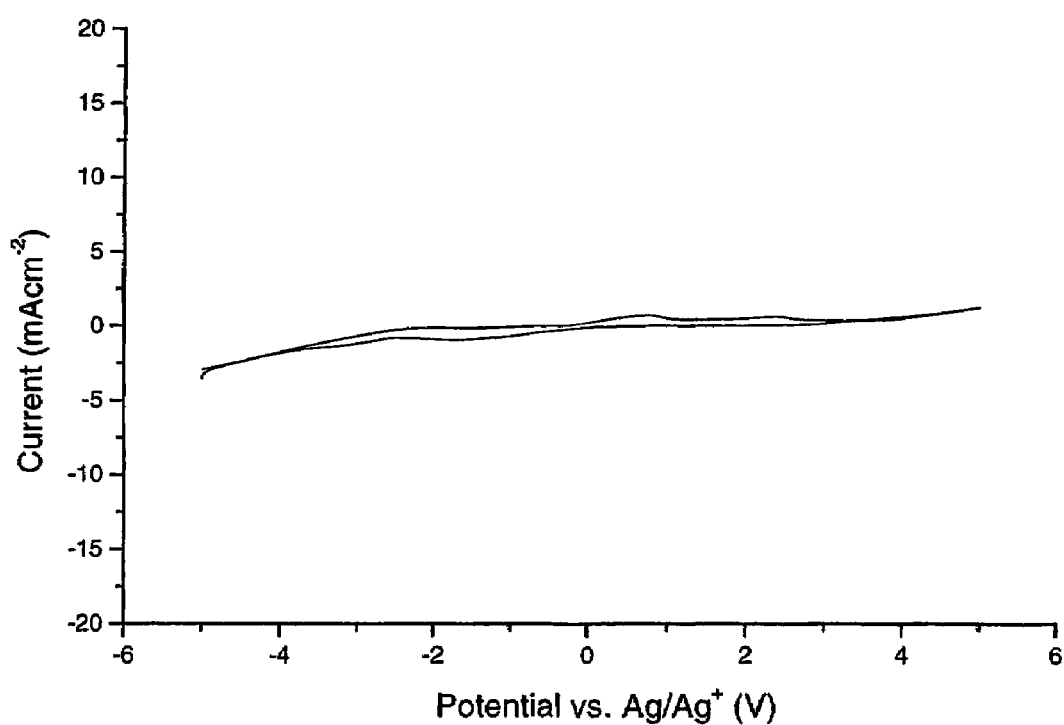
FIG. 14 is a graph of the electrochemical window for a phosphorous-based room temperature ionic liquid as described in Example 13.

The electrochemical stability of phosphonium based RTILs is indicated by example 13. In this example a room temperature ionic liquid comprising a phosphonium cation with three n-butyl groups, a single n-hexadecane chain and xylene sulfonate anion (P$_{44416}$XS) was used. The phosphonium based RTIL was tested in the 3-electrode cell, using a platinum working electrode, glassy carbon counter electrode and a silver quasi-reference electrode. The test was conducted at 100 mVs$^{-1}$ at 100° C. The results are presented in FIG. 14. This figure shows that electrode exhibits minimal current response over a 10V range, indicating sufficient stability for application in an electrochemical device such as a rechargeable lithium cell.

It will be understood to persons skilled in the art of the invention that the examples outlined above are illustrative only, and many modifications may be made without departing from the spirit and scope of the invention.

The invention claimed is:

1. An electrolyte for use in an energy storage device, the electrolyte comprising a room temperature ionic liquid of:

(i) a cation of Formula I:

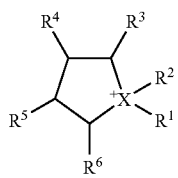

in which X is N, P or As
R$^1$ is alkyl or a fully or partially halogenated alkyl;
R$^2$ is alkyl or a fully or partially halogenated alkyl;
R$^3$ to R$^6$ are each independently H, alkyl, halo, fully or partially halogenated alkyl, nitrile, alkyl substituted by nitrile or heteroatom, or any other group; and
(ii) an anion;
together with
(iii) lithium ions.

2. The electrolyte of claim 1, wherein R$^3$ to R$^6$ are each H or halo.

3. The electrolyte of claim 1, wherein R$^1$ is methyl or partially or fully halogenated methyl.

4. The electrolyte of claim 1, wherein X is N.

5. The electrolyte of claim 1, wherein the cation is not halogenated.

6. The electrolyte of claim 1, wherein the room temperature ionic liquid is selected from the group consisting of:
(a) salts of cations of Formula I in which R$^2$ is iso-propyl or an alkyl of 4 or more cations, and an anion;
(b) salts of cations of Formula I in which R$^2$ is methyl, ethyl or propyl, with an anion selected from the group consisting of:
(i) perfluorinated alkyl fluorides of boron
(ii) Halides, alkyl halides perhalogenated alkyl halides of group VA(15) other than PF$_6^-$
(iii) C$_x$Y$_{2x+1}$SO$_3^-$ where x=2 to 6 and y=F or H
(iv) sulfonyl amides, with the proviso that when the sulfonyl amide is a perfluorinated bis amide, the perfluorinated bis amide is of the formula (C$^x$Y$_{2x+1}$SO$_2$)$_2^-$ where x=3 to 6 and y=F
(v) C$_x$F$_{2x+1}$COO$^-$, where x is as defined above
(vi) sulfonyl and sulfonate compounds other than those of group (iv) above, including aromatic sulfonates
(vii) cyano group containing anions and cyanamide compounds including cyanide, dicyanamide and tricyanamide
(viii) Succinamide and perfluorinated succinamide
(ix) Ethylendisulfonylamide and its perfluorinated analogue
(x) SCN$^-$
(xi) Carboxylic acid derivatives, including C$_x$H$_{2x+1}$COO$^-$
(xii) where x is as defined above
(xiii) Weak base anions
(xiv) Halide ions
(c) salts of cation of Formula I which are partially or fully halogenated, and an anion;
(d) salts of cations of Formula I where X is P and an anion; and
(e) a mixture of two different cations of Formula I with one or more anions.

7. The electrolyte of claim 1, wherein R$^2$ is an alkyl of 2 or more carbon atoms, or a partially or fully halogenated alkyl of 2 or more carbon atoms.

8. The electrolyte of claim 7, wherein R$^2$ is an alkyl of 4 or more carbon atoms, or a partially or fully halogenated alkyl of 2 or more carbon atoms.

9. The electrolyte of claim 1, wherein R$^2$ is butyl, or partially or fully halogenated butyl.

10. The electrolyte of claim 1, wherein the anion is selected from the group consisting of:
(i) BF$_4^-$ and perfluorinated alkyl fluorides of boron
(ii) Halides, alkyl halides or perhalogenated alkyl halides of group VA(15)
(iii) C$_x$Y$_{2x+1}$SO$_3^-$ where x=0 to 6 and y=F or H
(iv) sulfonyl amides, including the bis amides and perfluorinated versions thereof
(v) C$_x$F$_{2x+1}$COO$^-$, where x is as defined above
(vi) sulfonyl and sulfonate compounds, including aromatic sulfonates
(vii) cyano group containing anions and cyanamide compounds including cyanide, dicyanamide and tricyanamide
(viii) Succinamide and perfluorinated succinamide
(ix) Ethylendisulfonylamide and its perfluorinated analogue
(x) SCN$^-$
(xi) Carboxylic acid derivatives, including C$_x$H$_{2x+1}$COO$^-$ where x is as defined above
(xii) Weak base anions
(xiii) Halide ions.

11. The electrolyte of claim 10, wherein the anion is selected from the group consisting of:
(i) BF$_4^-$ and perfluorinated alkyl fluorides of boron
(ii) Halides, alkyl halides or perhalogenated alkyl halides of group VA(15)
(iii) C$_x$Y$_{2x+1}$SO$_3^-$ where x=0 to 6 and y=F or H;
(iv) sulfonyl amides, including the bis amides and perfluorinated versions thereof; and
(vi) sulfonyl and sulfonate compounds, including aromatic sulfonates.

12. The electrolyte of claim 10, wherein the anion is selected from the group consisting of:
(i) perfluorinated alkyl fluorides of boron
(ii) Halides, alkyl halides perhalogenated alkyl halides of group VA(15) other than PF$_6^-$
(iii) C$_x$Y$_{2x+1}$SO$_3^-$ where x=2 to 6 and y=F or H
(iv) sulfonyl amides, with the proviso that when the sulfonyl amide is a perfluorinated bis amide, the perfluorinated bis amide is of the formula (C$_x$Y$_{2x+1}$SO$_2$)$_2^-$ where x =3 to 6 and y=F
(v) C$_x$F$_{2x+1}$COO$^-$, where x is as defined above
(vi) sulfonyl and sulfonate compounds other than those of group (iv) above, including aromatic sulfonates
(vii) cyano group containing anions and cyanamide compounds including cyanide, dicyanamide and tricyanamide
(viii) Succinamide and perfluorinated succinamide
(ix) Ethylendisulfonylamide and its perfluorinated analogue
(x) SCN$^-$
(xi) Carboxylic acid derivatives, including C$_x$H$_{2x+1}$COO$^-$ where x is as defined above
(xii) Weak base anions
(xiii) Halide ions.

13. The electrolyte of claim 1, wherein the electrolyte comprises a second room temperature ionic liquid.

14. The electrolyte of claim 13, wherein the second room temperature ionic liquid comprises a cation of Formula I and an anion.

15. The electrolyte of claim 1, comprising a solid electrolyte interphase-forming additive.

16. The electrolyte of claim 15, wherein the solid electrolyte interphase-forming additive is selected from the group consisting of:
polymers, including polyvinylpyrrolidone, polyethylene oxide, polyacrylonitrile, polyethylene glycols, glymes, perfluorinated polymers; and
salts, including magnesium iodide, aluminium iodide, tin iodide, lithium iodide, tetraethylammonium heptadecafluorooctanesulfonate, dilithiumpthalocyanine, lithium heptadecafluorooctanesulfonate, tetraethylammonium fluoride-tetrakis hydrogen fluoride.

17. The electrolyte of claim 1, comprising a gelling additive.

18. The electrolyte of claim 17, wherein the gelling additive is selected from the group consisting of:
inorganic particulate materials, including $SiO_2$, $TiO_2$ and $Al_2O_3$; and polymers or polymerizable monomer components, including methylmethacrylate, dimethylaminoacrylamide and dimethylaminoethylacrylamide.

19. The electrolyte of claim 1, wherein the lithium ions are associated with a counterion.

20. The electrolyte of claim 19, wherein the counterion is the same as the anion of the room temperature ionic liquid.

21. The electrolyte of claim 19, wherein the counterion is different to the anion of the room temperature ionic liquid.

22. The electrolyte of claim 1, wherein the lithium is present in an amount of from 0.01 to 2.0 mol/kg measured as moles of lithium per kilogram of total electrolyte.

23. The electrolyte of claim 22, wherein the lithium is present in an amount of from 0.1 to 1.5 mol/kg.

24. The electrolyte of claim 22, wherein the lithium is present in an amount of from 0.2 to 0.6 mol/kg.

25. The electrolyte of claim 1, comprising an organic solvent.

26. The electrolyte of claim 25, wherein the organic solvent is present in an amount of 0-90 wt %.

27. An energy storage device comprising an electrolyte as claimed in claim 1

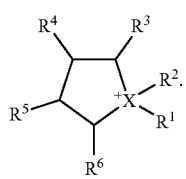

28. A secondary lithium battery comprising the electrolyte of claim 1.

29. The secondary lithium battery of claim 28, wherein the electrolyte has high stability towards lithium.

30. The secondary lithium battery of claim 28, wherein the electrolyte has a cycle life of at least 100 cycles.

31. A secondary lithium battery comprising:
(1) a battery case;
(2) battery terminals;
(3) an negative electrode;
(4) a positive electrode;
(5) a separator for separating the negative electrode from the positive electrode; and
(6) an electrolyte as claimed in claim 1.

32. The secondary lithium battery of claim 31, wherein the negative electrode comprises a metal substrate and a lithium metal surface formed either in situ or as a native film.

33. A method of charging the energy storage device of claim 27, comprising the step of charging at a charge rate of less than 0.25 mAcm$^{-2}$ during at least a part of the charging stage of the device or battery.

34. The method of claim 33, wherein the device or battery is charged at said rate for a period of not less than 5 minutes during the charging stage.

35. A method of conditioning the energy storage device of claim 27, comprising the steps of discharging the device or battery and recharging the device or battery, wherein the recharging is conducted at a rate of less than 0.25 mAcm$^{-2}$ for at least a part of the recharging stage.

36. The method of claim 35, wherein the recharging at said rate of less than 0.25 mAcm$^{-2}$ is conducted for a period of not less than 5 minutes.

37. A supercapacitor comprising:
a device case;
terminals for electrical connection;
a supercapacitor negative electrode;
a supercapacitor positive electrode;
a separator for maintaining physical separation of the negative electrode and the positive electrode; and
an electrolyte comprising a cation of Formula 1:

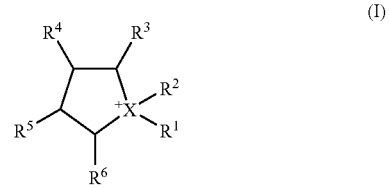

in which X is N, P or As
$R^1$ is alkyl or a fully or partially halogenated alkyl;
$R^2$ is alkyl or a fully or partially halogenated alkyl;
$R^3$ to $R^6$ are each independently H, alkyl, halo, fully or partially halogenated alkyl, nitrile, alkyl substituted by nitrile or heteroatom, or any other group; and an anion; together with lithium ions.

38. An asymmetric battery-supercapacitor comprising:
a device case;
terminals for electric connection;
a negative electrode;
a positive electrode;
a separator for maintaining physical separation of the negative electrode and the positive electrode; and
the electrolyte of claim 1;
wherein one of said negative electrode and positive electrode is a battery electrode, and the other of said electrodes is a supercapacitor electrode.

39. A method for preparing the electrolyte of claim 1, adding lithium ions in the form of a salt to said room temperature ionic liquid, mixing and drying under vacuum at elevated temperature.

40. The method of claim 39, wherein the electrolyte is subjected to degassing.

* * * * *